United States Patent Office 3,052,603
Patented Sept. 4, 1962

3,052,603
TRIFLUOROMETHYLHYDROXYBENZOIC ACIDS
AND THEIR GROUP I METAL SALTS
Murray Hauptschein, Glenside, Pa., assignor to Pennsalt Chemicals Corporation, Philadelphia, Pa., a corporation of Pennsylvania
No Drawing. Filed May 15, 1958, Ser. No. 735,647
9 Claims. (Cl. 167—58)

This invention relates to derivatives of hydroxybenzoic acids. Particularly it relates to compounds represented by the formula

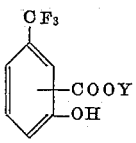

wherein Y is a member selected from the class consisting of hydrogen and a group I metal radical and wherein the group —COOY is in a position not ortho to both the trifluoromethyl and hydroxyl groups. More particularly it relates to 2-trifluoromethyl-4-hydroxybenzoic acid, 3-trifluoromethyl-5-hydroxybenzoic acid, 4-trifluoromethyl-6-hydroxybenzoic acid, and the group I metal salts of said acids, especially silver-4-trifluoromethyl-6-hydroxybenzoate.

The compounds of this invention are particularly useful as fungicides. They are also useful as chemical intermediates for the preparation of other valuable compounds, e.g. dicarboxylic acids or azo dyes.

This application is a continuation-in-part of copending application Serial No. 447,390, filed August 2, 1954.

The novel compounds of this invention are prepared by various methods, most of them previously known. 4-trifluoromethyl-6-hydroxybenzoic acid, hereinafter referred to as 4-trifluoromethylsalicylic acid, is prepared by the method disclosed and claimed in U.S. 2,894,984, also derived from said Serial No. 447, 390. The method comprises direct carboxylation of m-trifluoromethylphenol with carbon dioxide and an alkali metal carbonate under pressure at a temperature in the range from about 20° C. to about 250° C. followed by acidification of the reaction mass according to the following equation, wherein M is Na, Li, or K:

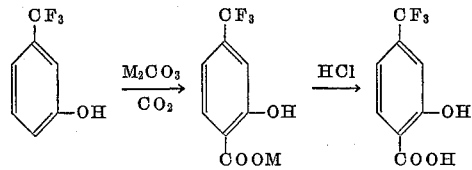

The preparation of 4-trifluoromethylsalicylic acid and its properties and structure are more fully disclosed in the following example.

EXAMPLE 1

*Preparation of 4-Trifluoromethylsalicylic Acid* m-Trifluoromethylphenol (48.6 g.) and granular anhydrous potassium carbonate (124.4 g.) were intimately dispersed in a copper bomb of 250 ml. capacity, and carbon dioxide gas from a commercial cylinder was introduced at 300 p.s.i. at room temperature. The temperature was allowed to rise very slowly over a period of ten days to 220° C. It was noted that some carbon dioxide was absorbed even at room temperature and at 140° C. the reaction was nearly completed. As the carbon dioxide was taken up, additional gas was introduced. At the completion of the reaction the bomb was cooled, vented, and opened. The product was a hard cake of potassium-4-trifluoromethylsalicylate. The cake was dissolved in hot water. The solution was extracted with ether, neutralized to a pH of about 6, decolorized with charcoal and filtered. The filtrate was acidified with concentrated hydrochloric acid. An 88% yield of 4-trifluoromethylsalicylic acid was obtained. No isomers were found present, and only a trace of unreacted phenol was detected in the product. On recrystallization from alcohol and water, the 4-trifluoromethylsalicylic acid was found to melt at 178–178.5° C. (white needles).

*Analysis.*—Calcd. for $C_8H_5C_3F_3$: C, 46.61; H, 2.45; mol. wt. 206. Found: C, 46.55; H, 2.46; mol. wt. (neut. eq.), 208.

4-trifluoromethylsalicylic acid is miscible with ethanol but only very slightly soluble in water.

Crystalline 4-trifluoromethylsalicylic acid (0.80 g.) made by the above method was heated in a Pyrex tube on a Bunsen flame with 6 ml. of concentrated sulfuric acid. The solution turned deep brown and hydrogen fluoride fumes were liberated. After pouring the reaction mass into ice-water and recrystallizing the resultant precipitate with alcohol and water, there was isolated 0.60 g. (85%) of the known 2-hydroxyterephthalic acid (M.P. 327° C.; dimethyl ester, M.P. 93–94° C.; recrystallized from alcohol), thus proving the structure to be that of 4-trifluoromethylsalicylic acid.

The preparations and properties of 2-trifluoromethyl-4-hydroxybenzoic acid, which has the formula

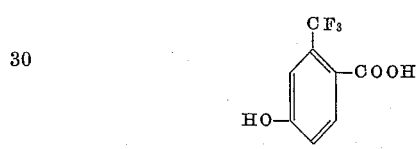

and of 3-trifluoromethyl-5-hydroxybenzoic acid, which has the formula

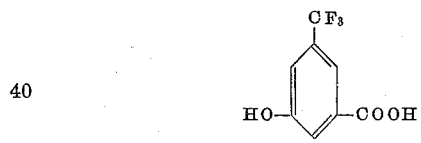

are disclosed in the following examples.

EXAMPLE 2

*Preparation of 2-Trifluoromethyl-4-Hydroxybenzoic Acid*

2-trifluoromethyl-4-nitroaniline was converted into 2-trifluoromethyl-4-nitrobenzonitrile via the Sandmeyer reaction using potassium nickelocyanide in 32.5% yield. It melted at 48–49.5° C. (recrystallized from 20% aqueous alcohol).

*Analysis.*—Calcd. for $C_8H_3O_2N_2F_3$: C, 44.46; H, 1.40; N, 12.96. Found: C, 44.73; H, 1.32; N, 12.90.

Two and seven-tenths grams of said 2-trifluoromethyl-4-nitrobenzonitrile in 25 ml. of 63% sulfuric acid were heated slowly to 182° C. and kept at that temperature for half an hour. The cooled solution was thrown on ice and there were collected 2.6 g. (92%) of 2-trifluoromethyl-4-nitrobenzoic acid M.P. 137–140° C. A single recrystallization from water gave white platelets, M.P. 138.5–140° C.

*Analysis.*—Calcd. for $C_8H_4O_4F_3N$: C, 40.86; H, 1.71; N, 5.96. Found: C, 40.77; H, 1.61; N, 6.15.

When 75% sulfuric acid was used, 4-nitrophthalic acid was formed, due to hydrolysis of the trifluoromethyl group, while 55–60% sulfuric acid yielded some of the amide due to incomplete hydrolysis of the nitrile.

Reduction of said 2-trifluoromethyl-4-nitrobenzoic acid with iron and ammonium chloride gave white crystals of 4-amino-2-trifluoromethylbenzoic acid, M.P. 185.5–187° C. in 75% yield.

*Analysis.*—Calcd. for $C_8H_6O_2NF_3$: C, 46.84; H, 2.95; N, 6.83. Found: C, 46.85; H, 2.94; N, 6.93.

Eighty-two hundredths gram of said 4-amino-2-trifluoromethylbenzoic acid was dissolved in a solution of 4 ml. of concentrated sulfuric acid and 20 ml. of water, and was diazotized with 0.28 g. of sodium nitrite in 4 ml. of water. The diazonium solution was then added in portions to a refluxing solution of 4 ml. of concentrated sulfuric acid in 32 ml. of water and heated for one hour. After cooling and extracting with ether there was isolated 0.7 g. of crude material which melted below 100° C. and probably contained much water of hydration. After a recrystallization from benzene the product melted at 150–153.5° C. (0.5 g. 61%). Two additional recrystallizations from benzene afforded pure white 2-trifluoromethyl-4-hydroxybenzoic acid, M.P. 152.5–154° C.

*Analysis.*—Calcd. for $C_8H_5O_3F_3$: C, 46.61; H, 2.45. Found: C, 46.78; H, 2.75.

EXAMPLE 3

*Preparation of 3-Trifluoromethyl-5-Hydroxybenzoic Acid* m-Trifluoromethylbenzoic acid was prepared in high yield by the reaction of the Grignard reaction products of m-bromo- and m-iodobenzotrifluoride with carbon dioxide. Eighty-one grams of this acid, M.P. 103–104° C., were added with stirring to 500 g. of fuming sulfuric acid. Nitric acid (90% sp. gr. 1.5, 125 g.) was introduced gradually to the mixture with efficient stirring, the temperature being maintained below 70° C. The reaction mixture was heated on a water bath for an additional 4–5 hours and then poured upon crushed ice, filtered, washed thoroughly with water, and dried at 70° C. There were isolated 90 g. (90%) of the white 3-trifluoromethyl-5-nitrobenzoic acid, M.P. 127–129° C.; recrystallized from water, M.P. 128–129° C.

*Analysis.*—Calcd. for $C_8H_4O_4NF_3$: C, 40.86; H, 1.71; N, 5.96. Found: C, 41.01; H, 1.78; N, 6.04, 5.94.

Thirty-five grams of said 3-trifluoromethyl-5-nitrobenzoic acid were added in portions to a stirred mixture of 48 g. of iron powder and a solution of 24.5 g. of ammonium chloride in 400 ml. of water at 50° C. The mixture was refluxed with stirring for three hours, during which time so much foaming was encountered that it was necessary to replace the 2 liter reaction flask with a 3 liter one. The mixture was then treated with 10% sodium carbonate, filtered, and neutralized with concentrated hydrochloric acid. The solution was allowed to stand overnight. 21.6 g. of precipitate formed. This crude product was redissolved and reprecipitated with acid. There was isolated 16.7 g. (55%) of white 3-amino-5-trifluoromethylbenzoic acid, M.P. 141–142.5° C.

*Analysis.*—Calcd. for $C_8H_6O_2NF_3$: C, 46.84; H, 2.95; N, 6.83. Found: C, 46.72; H, 3.23; N, 6.89, 6.72.

One gram of said 3-amino-5-trifluoromethylenzoic acid was diazotized in sulfuric acid and then hydrolyzed essentially as described previously affording 0.6 g. (60%) of white 3-trifluoromethyl - 5 - hydroxybenzoic acid, M.P. 191.5–192.5° C. (decolorized and recrystallized from hot water).

*Analysis.*—Calcd. for $C_8H_5O_3F_3$: C, 46.61; H, 2.45. Found: C, 46.87; H, 2.79.

The structure of 2-trifluoromethyl-4-hydroxybenzoic acid and of 3-trifluoromethyl-5-hydroxybenzoic acid is readily confirmed by converting each to its corresponding dicarboxylic acid in the manner described above for the 4-trifluoromethylsalicylic acid compound. The resulting dicarboxylic acids are useful reactants with polyhydric alcohols to form polyester resins and plastics, often called alkyd resins, useful in the manufacture of paints and varnish.

The novel trifluoromethylhydroxybenzoic acid of this invention are readily converted to trifluoromethylhydroxybenzoates of group I metals and are especially useful in this new form in fungicidal applications. It is to be noted that the acid compound is the active material and its activity is effective whether it is used as such or in the form of a salt. The change at the carboxyl group of the acid is a mere change in form and not in essential character.

The metal salts of said trifluoromethylhydroxybenzoic acids are prepared by reacting acids with a water-soluble inorganic salt of a metal selected from group I of the periodic table of elements, in particular the carbonate or bicarbonate of lithium, sodium or potassium and the nitrate or chloride of copper, rubidium, silver, cesium or gold. The preparation of said metal salts is shown in the following examples wherein 4-trifluoromethylsalicylic acid (4-trifluoromethyl-6-hydroxybenzoic acid) is used by way of example of one of the trifluoromethylhydroxybenzoic acids of this invention.

EXAMPLE 4

*Preparation of Silver-4-Trifluoromethylsalicylate*

4-trifluoromethylsalicylic acid is neutralized with aqueous ammonia and reacted with silver nitrate solution to give a quantitative yield of silver-4-trifluoromethylsalicylate, which precipitates from the solution.

*Analysis.*—Calcd. for $C_8H_4O_3F_3Ag$: Ag, 34.47. Found: Ag, 34.27.

EXAMPLE 5

*Preparation of Cuprous-4-Trifluoromethylsalicylate*

4-trifluoromethylsalicylic acid is neutralized with aqueous ammonia and reacted with cuprous chloride solution to give cuprous-4-trifluoromethylsalicylate in the form of a precipitate.

EXAMPLE 6

*Preparation of Cupric-Bis(4-Trifluoromethylsalicylate)*

4-trifluoromethylsalicylic acid is neutralized with aqueous ammonia and reacted with cupric chloride solution to give cupric-bis(4-trifluoromethylsalicylate) in the form of a precipitate.

EXAMPLE 7

*Preparation of Sodium-4-Trifluoromethylsalicylate*

Sodium-4-trifluoromethylsalicylate is prepared by dissolving 4-trifluoromethylsalicylic acid in 10% sodium carbonate solution, cooling in ice, and collecting the salt formed. It is a white solid which is soluble in water.

EXAMPLE 8

*Preparation of Lithium-4-Trifluoromethylsalicylate*

4-trifluoromethylsalicylic acid is dissolved in 5% lithium bicarbonate solution, with ice cooling. Lithium-4-trifluoromethylsalicylate forms and precipitates from the solution.

EXAMPLE 9

*Preparation of Potassium-4-Trifluoromethylsalicylate*

4-trifluoromethylsalicylic acid is reacted with a 10% potassium carbonate solution cooled with ice. Potassium-4-trifluoromethylsalicylate forms and precipitates from the solution.

The other group I metal salts of 4-trifluoromethylsalicylic acid, i.e., those of rubidium, cesium and gold, may be prepared by using a method similar to that shown in Examples 4–6. Thus, 4-trifluoromethylsalicylic acid can be reacted respectively with rubidium chloride, cesium nitrate, auric chloride and aurous chloride according to the procedure of Example 4 to form the respective salts:

Rubidium-4-trifluoromethylsalicylate,
Cesium-4-trifluoromethylsalicylate,
Auric-tris(4-trifluoromethylsalicylate), and
Aurous-4-trifluoromethylsalicylate.

The group I metal salts of 2-trifluoromethyl-4-hydroxybenzoic acid and of 3-trifluoromethyl-5-hydroxybenzoic acid can be prepared by substituting the respective acids for 4-trifluoromethylsalicylic acid in the processes described in Examples 4–10 and in the above paragraph.

The compounds of this invention are useful as fungicides, particularly in the control of the growth of *T. Mentagrophytes*, associated with ringworm of the skin. This fungicidal activity of the compounds, as a kerotolytic agent, is demonstrated in the following examples wherein 4-trifluoromethylsalicylic acid is used by way of example.

EXAMPLE 10

A 5% solution of 4-trifluoromethylsalicylic acid in propylene glycol 200 (M.W.) was prepared and used in control of the growth of *T. mentagrophytes* on infected scales. Salicylic acid was used for comparison of the relative activity with a diluent control sample. The data and results are shown in Table I where +=growth and 0=no growth.

TABLE I

| Concentration of Compound | Exposure Time | | | |
|---|---|---|---|---|
| | 5 min. | 15 min. | 30 min. | 1 hr. |
| 5% Trifluoromethylsalicylic acid | + | 0 | 0 | 0 |
| 5% Salicylic acid | + | + | 0 | 0 |
| Diluent Control | + | + | + | + |
| Scales Growth Control | + | | | |

From the test results it will be noted that 4-trifluoromethylsalicylic acid has definite antifungal activity, killing the organism with 5 to 15 minutes' exposure time. It is also shown to be superior to salicylic acid in this property.

EXAMPLE 11

A beneficial powder for treatment of ringworm of the feet is prepared by mixing together five parts of 4-trifluoromethylsalicylic acid, two parts of menthol, eight parts of camphor, 50 parts of boric acid and 35 parts of starch.

2-trifluoromethyl-4-hydroxybenzoic acid and 3-trifluoromethyl-5-hydroxybenzoic acid and any of the group I metal salts of them, or of 4-trifluoromethylsalicylic acid, can each be formulated individually or in admixture into fungicidal compositions useful in said ringworm treatment by substituting each or a mixture of them for 4-trifluoromethylsalicylic acid in the composition disclosed in Example 11.

2-trifluoromethyl - 4 - hydroxybenzoic acid, and 4-trifluoromethylsalicylic acid and 3-trifluoromethyl - 5 - hydroxybenzoic acid are also each useful as chemical intermediates for coupling with negatively substituted diazotized amines to form dye compounds, as disclosed and claimed in copending application Serial No. 735,644, filed May 15, 1958.

The above-described embodiments of the invention are presented for the purpose of illustration. Many widely different embodiments of this invention can be made without departing from the spirit and scope thereof, and it is to be understood that the invention is not intended to be limited by the above-noted specific embodiments.

I claim:

1. A process for controlling fungus disease of the epidermis by applying thereto a fungicidal amount of a mixture comprising a carrier and a compound selected from the group consisting of 2-trifluoromethyl-4-hydroxybenzoic acid, 3-trifluoromethyl-5-hydroxybenzoic acid, 4-trifluoromethyl-6-hydroxybenzoic acid and group I metal salts of each of said acids.

2. As a fungicidal keratolytic composition, a mixture comprising a carrier and a compound selected from the group consisting of 2-trifluoromethyl-4-hydroxybenzoic acid, 3-trifluoromethyl-5-hydroxybenzoic acid, 4-trifluoromethyl-6-hydroxybenzoic acid and group I metal salts of each of said acids.

3. The composition according to claim 2 wherein the carrier is a finely-divided solid.

4. As a fungicidal keratolytic composition, a mixture comprising 4-trifluoromethylsalicylic acid dispersed with a finely-divided solid carrier.

5. A compound selected from the group consisting of 2-trifluoromethyl-4-hydroxybenzoic acid, 3-trifluoromethyl-5-hydroxybenzoic acid, 4-trifluoromethyl-6 - hydroxybenzoic acid and group I metal salts of each of said acids.

6. 2-trifluoromethyl-4-hydroxybenzoic acid.

7. 3-trifluoromethyl-5-hydroxybenzoic acid.

8. 4-trifluoromethylsalicylic acid.

9. Silver-4-trifluoromethylsalicylate.

References Cited in the file of this patent

UNITED STATES PATENTS

| | | |
|---|---|---|
| 2,114,369 | Bickenheuser | Apr. 19, 1938 |
| 2,244,769 | Doelling | June 10, 1941 |
| 2,576,987 | Wyman | Dec. 4, 1951 |
| 2,685,600 | Morris | Aug. 3, 1954 |
| 2,731,386 | Reiner | Jan. 17, 1956 |
| 2,821,551 | Katzschmann | Jan. 28, 1958 |
| 2,894,984 | Hauptschein | July 14, 1959 |